United States Patent [19]

Parker et al.

[11] Patent Number: 5,561,519
[45] Date of Patent: *Oct. 1, 1996

[54] REMOTE-CONTROLLED TRACKING SYSTEM FOR TRACKING A REMOTE CONTROL UNIT AND POSITIONING AND OPERATING A CAMERA AND METHOD

[75] Inventors: Jeffrey L. Parker; David F. Sorrells; John D. Mix; Richard P. Daber, all of Jacksonville, Fla.

[73] Assignee: ParkerVision, Inc., Jacksonville, Fla.

[ * ] Notice: The term of this patent shall not extend beyond the expiration date of Pat. No. 5,517,300.

[21] Appl. No.: 470,050

[22] Filed: Jun. 6, 1995

Related U.S. Application Data

[62] Division of Ser. No. 197,669, Feb. 17, 1994, Pat. No. 5,517,300, which is a continuation of Ser. No. 736,729, Jul. 26, 1991, abandoned, which is a continuation-in-part of Ser. No. 530,999, May 31, 1990, Pat. No. 5,268,734.

[51] Int. Cl.⁶ .................. G01C 1/00; G01J 1/20; G05B 1/06; G02B 13/16
[52] U.S. Cl. .................. 356/139.06; 250/203.3; 250/206.2; 250/231.18; 318/640; 348/169; 352/53
[58] Field of Search ............... 250/231.18, 203.3, 250/206.1, 206.2; 318/640, 648; 356/139.06; 354/81; 352/53, 197, 243; 348/169

[56] References Cited

U.S. PATENT DOCUMENTS

| | | | |
|---|---|---|---|
| 4,905,315 | 2/1990 | Solari et al. | 318/640 |
| 4,931,636 | 6/1990 | Huggins | 250/226 |
| 4,945,367 | 7/1990 | Blackshear | 354/81 |
| 4,970,380 | 11/1990 | Miller | 250/205 |
| 4,974,088 | 11/1990 | Sasaki | 358/210 |
| 4,980,871 | 12/1990 | Sieber et al. | 318/648 |
| 4,998,125 | 3/1991 | Watanabe et al. | 354/403 |
| 5,012,335 | 4/1991 | Cohodar . | |
| 5,014,080 | 5/1991 | Miyadera | 354/403 |
| 5,073,824 | 12/1991 | Vertin | 358/210 |

FOREIGN PATENT DOCUMENTS

| 191133 | 8/1988 | Japan | 358/125 |
|---|---|---|---|

*Primary Examiner*—Stephen C. Buczinski
*Attorney, Agent, or Firm*—Arthur G. Yeager

[57] ABSTRACT

The system includes improvements to a remote tracking system for motion picture as well as still picture cameras. The system provides for improved motor control for PAN and TILT functions including motor turn-off in the event of stall; the use of optical means to provide position feedback through the use of a light-blocking disk graduated on a "gray scale" which eliminates mechanical contacts; mechanical levers that are motor driven for operation of ON/OFF and ZOOM functions of a motion picture camera or shutter control for a still camera via either the base or remote unit command circuitry. The remote unit is formed as a hand-held wand and also provides audio circuitry. A space diversity RF receiver is used to improve the communication link between the remote unit and the base unit.

28 Claims, 14 Drawing Sheets

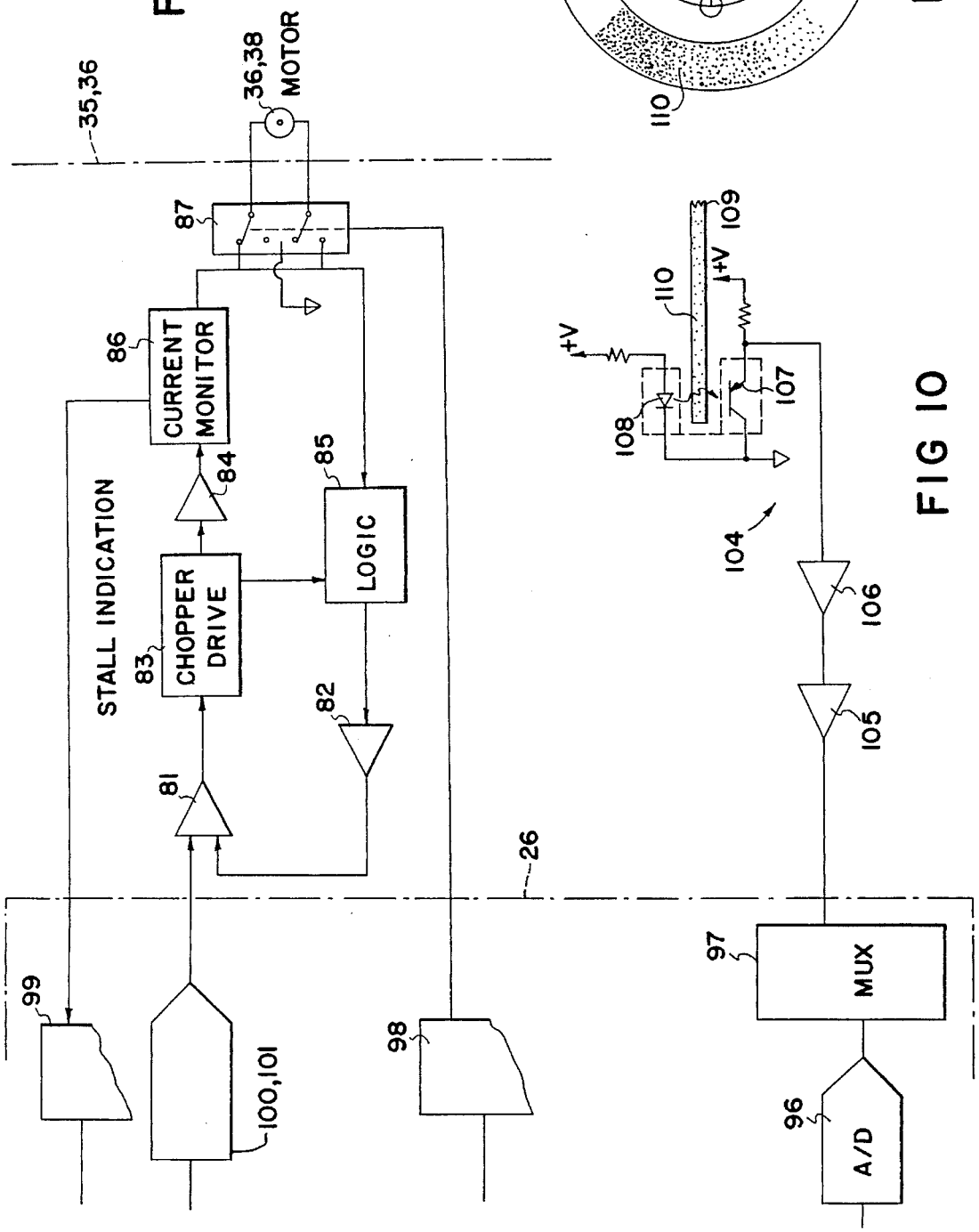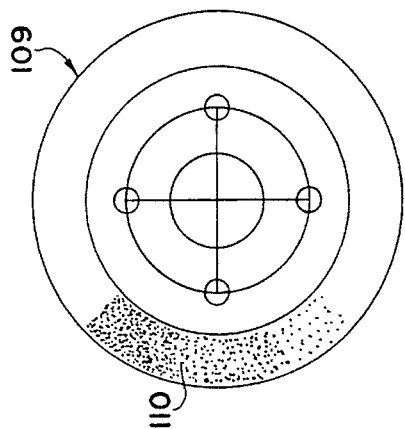

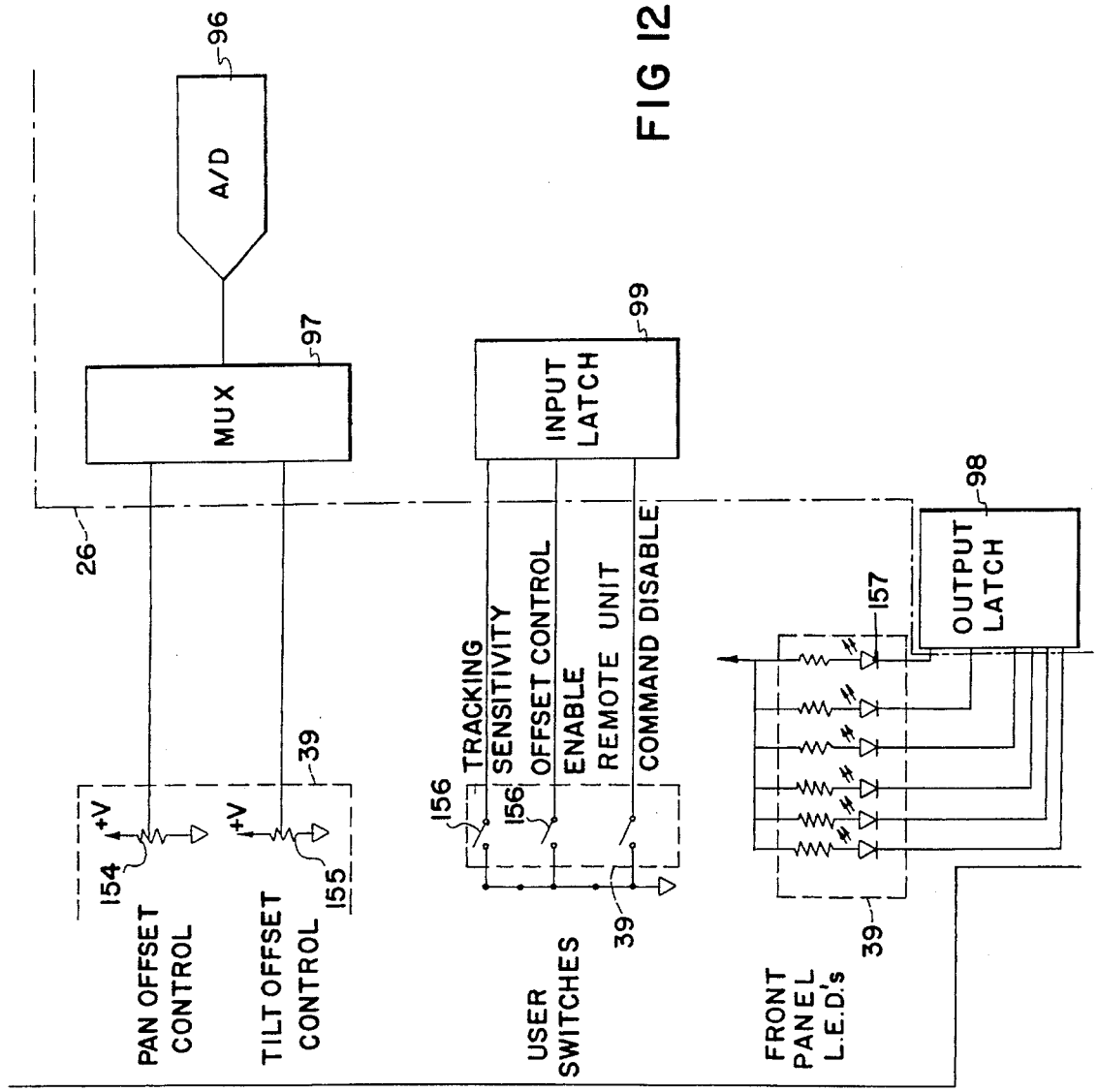

REMOTE-CONTROLLED TRACKING SYSTEM FOR TRACKING A REMOTE CONTROL UNIT AND POSITIONING AND OPERATING A CAMERA AND METHOD

CROSS REFERENCE TO RELATED APPLICATION

This application is a division of application Ser. No. 08/197,669 entitled "Remote-Controlled Tracking System For Tracking A Remote-Control Unit And Positioning And Operating A Camera", which was filed on Feb. 17, 1994, now U.S. Pat. No. 5,517,300, which is a continuation of Ser. No. 07/736,729, filed Jul. 26, 1991, now abandoned, which is a C-I-P of Ser. No. 07/530,999, filed May 31, 1990, now U.S. Pat. No. 5,268,734. Another related application Ser. No. 07/875,078, is entitled "A Remote Controlled Tracking System For Tracking A Remote Control Unit And Positioning And Operating A Cantera And Method", which was filed on Apr. 28, 1992, now abandoned, which is a continuation of Ser. No. 08/196,774, filed Feb. 14, 1994, now U.S. Pat. No. 5,432,597.

NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to improvements in tracking systems that track a remote control unit and allow cameras to automatically follow moving targets and particularly to systems that allow remote control of such tracking cameras.

2. Prior Art

Apparatus for automatic tracking of cameras is known to the prior art and includes the system discussed in the above-referenced application.

While the remote tracking system represented a major advance in the art, improvements and refinements to the prior system are desirable however, and should include having apparatus to detect motor stall for the PAN and TILT motors. The RF receiver used as the communication link should include a design to minimize the loss of continuity in the RF link. The system should also include remote unit commands and apparatus to allow for direct operation of the camera controls and improved instrumentation for monitoring and using the system features. The system should also provide for load-independent control of the PAN and TILT motors to accommodate cameras of different weight.

SUMMARY OF THE INVENTION

In accord with the present invention there is provided a remote-controlled tracking system for tracking a movable remote control unit which comprises a base station having control circuit means for automatically determining the relative position and movement of the remote control unit with respect to the base station and providing control output signals in response thereto. The base station includes movable means responsive to the control circuit means for moving the base station in response to the control output signals and includes position feedback circuit means for providing a position feedback output signal to the control circuit means indicative of the position of the base station with respect to a reference position as established by the control circuit means. The control circuit means provides control output signals to the movable means for moving the base station in response to the position feedback output signal.

The position feedback circuit means includes light emitter means for emitting light and a light level detector means for detecting light emitted by the emitter means and includes light level blocking means mounted to the movable means and positioned between the light emitter means and the light level detector means for varying the level of light detected by the light level detector means with respect to movement of the base station by the movable means. The light level detector means provides a light level output signal to the control circuit means indicative of the level of light detected by the detector means. The light level blocking means includes a member having a light blocking material distributed throughout in a known manner to provide that the light level output signal to the control circuit means is indicative of the relative position of the light level blocking means with respect to the emitter means.

In another aspect of the invention, the base station further includes either a moving picture or still camera having a plurality of controls for operation thereof and operation control means removably attachable to the camera for selectively operating at least one of the controls of the camera, the operation control means being responsive to the control circuit means for selective operation of the controls. The operation control means includes a plurality of lever means and a plurality of lever operating means operatively connected to the lever means and the circuit means and operable thereby. Each lever operating means includes a lever motor and lever motor control circuit means responsive to the control circuit means for operation of respective lever motor. The lever motor control circuit means has a first mode of operation for operating the lever motor in a first direction to move a respective lever means in a first direction to operate respective control to initiate the respective function of the control and a second mode of operation for operating the lever motor in a second direction to move the respective lever means in a second direction to not operate the respective control.

The remote unit is shaped as an elongate hand-held device and includes command circuit means for selectively providing a command signal to the control circuit means which is responsive to the command signal for providing a first control output signal to the operation control means for selective operation thereof. The controls of the camera include an ON/OFF switch for operating the camera ON and OFF and the command circuit means includes command switch means for selectively providing the command signal in response to operation of the command switch means. A first operation of the command switch means providing a CAMERA ON/OFF signal for operation of the camera ON or OFF in response to selected operation of the command switch means. The control circuit means provides the first control output signal to the operation control means for operating the camera ON and OFF respectively in response to reception of respective command signal be the control circuit means. Another control of the camera includes a ZOOM control switch for controlling the ZOOM features of the camera, a operation of the command switch means provides the command signal for operation of the ZOOM control of the camera, the control circuit means providing the second output signal to the operation control means for operating the ZOOM control switch in response to reception of the command signal by the control circuit means.

In still another aspect of the invention the remote control unit including a signal transmitter, the signal transmitter being a radio frequency signal transmitter, the control circuit means includes a radio frequency space diversity receiver means, the diversity receiver means including a pair of spaced apart antennas for minimizing the possibility of a loss of continuous reception of the remote unit signal by the diversity receiver means. The diversity receiver means includes a pair of receiver circuit sections each receiving an input signal from a corresponding antenna and providing a section output signal. Switch logic circuit means is responsive to a quality of the section output signals for selectively providing one section output signal as the receiver output signal in response to the quality of the section output signals. The quality of the signal that is monitored is noise by way of circuitry responsive thereto and which operates the switch logic circuit means.

In another aspect of the present invention, there is provided a remote control unit including command circuit means for selectively providing an OVERRIDE command signal to the control circuit means, which is responsive to the OVERRIDE command signal for operating the movable means to cease tracking the remote control unit. There is provided a DIRECTION OF MOVEMENT signal to the control circuit means for moving the movable means in a direction as determined by the DIRECTION OF MOVEMENT signal and a SPEED CONTROL signal to the control circuit means for moving the movable means at a speed as determined by the SPEED CONTROL signal. Also, the command circuit means selectively provides a TRACKING command signal to the control circuit means to resume tracking the remote control unit.

Additional signals include a LOCATION PRESET command signal to the control circuit means, the control circuit means being responsive to the LOCATION PRESET command signal to place data indicative of the position of the base station into the memory and a LOCATION signal to the control circuit means, the control circuit means being responsive to the LOCATION signal to cease tracking the remote control unit and move the movable means to position the base station in accordance with the data placed in the memory. Also, there is provided a STEALTH command signal to the control circuit means, the control circuit means being responsive to the STEALTH command signal to move the movable means when the tracking mode is inoperative.

In other aspects of the invention, there is provided a method of positioning and operating a camera mounted on a tracking unit that is movable by a controller to track a movable remote control unit for recording still pictures by the camera comprising the steps of: a) providing a still camera having an actuating means to capture a still picture; b) providing control means to operate the actuating means; c) tracking the remote control unit by the tracking unit; and d) providing a command to the control means to operate the actuating means. Step b may include providing mechanical means in the operation control means for operating the actuating means of the camera. Step d may include providing means to stop tracking of the remote control unit by the tracking unit; and providing a command to the control means to control the actuating means. Step c may include providing means for determining when the tracking unit and the remote control unit are aligned to the limits of resolution of the tracking unit.

In accord with the present invention, there is also provided a method of positioning and operating a camera mounted on a tracking unit that is movable by a controller to track a movable remote control unit for recording pictures by the camera comprising the steps of: a) providing a camera and a tracking unit that is movable by tracking commands from the controller in at least one plane; and b) providing first means to override the tracking commands from the controller to provide for movement of the tracking unit in response to signals from the first means. Step b may include the step of providing a remote control unit as the means to override the tracking commands from the controller and to provide signals to the controller and providing a computer connected to the tracking unit and forming the first means to override the tracking commands from the controller. The method may include the step of providing second means to resume the movement of the tracking unit in response to tracking commands from the controller. Additional steps may include providing second means for manually controlling the speed at which the tracking unit is to be moved in response to signals the first means; providing by the remote control unit a DIRECTION OF MOVEMENT signal to the controller for moving the tracking unit in a plane; and providing by the remote control unit a SPEED CONTROL signal to the controller for moving the tracking unit in response to the DIRECTION OF MOVEMENT signal of Step c in FAST SPEED or SLOW SPEED as determined by the SPEED CONTROL signal.

Further steps provided in accord with the present invention include providing at least one electric motor operated from the controller to move the tracking unit in at least one plane; monitoring by the controller the electric power supplied to the electric motor for indicating that the motor has stalled; removing by the controller the electric power to the electric motor when the power supplied to the motor exceeds a predetermined level as established by the controller; providing a radio frequency signal transmitter at the remote control unit for transmitting a radio frequency signal from the remote control unit to the controller containing information indicative of the position and movement of said remote control unit; providing a space diversity radio frequency receiver at the controller to enhance continuity of reception of the radio frequency signal by the controller; transmitting the radio frequency signal to the controller; receiving the signal by the controller; moving the tracking unit by the controller in response to such signal received; providing a position detector for detecting the movement of the tracking unit; providing by the position detector an output signal indicative of the position of the tracking unit to the controller; moving the tracking unit by the controller in response to the output signal from the position detector; providing an audio microphone at said remote control unit for providing an audio component in the radio frequency signal; providing circuit means in the controller for processing the audio component in the radio frequency signal; transmitting the radio frequency signal containing the audio component; providing operation control means attachable to the camera for operating the camera in response to the controller; operating by the controller the mechanical means; providing a camera having a ZOOM function and having a ZOOM control for operating the ZOOM function and a tracking unit that is movable by the controller to be movable in at least one plane; providing operation control means attachable to the camera for operating the ZOOM control of the camera in response to commands from the controller; providing by the controller commands to the operation control means to operate the ZOOM control of the camera; providing a first means for determining the position of the tracking unit; providing by the first means an output signal indicative of the position of the tracking unit to the controller; providing a second means to remember at least one position of the tracking unit; providing a third means of determining when to remember the position; providing a fourth means to have the controller discontinue tracking of the remote control unit and move the tracking unit to a position so remembered; and providing a fifth means to have the controller to resume tracking of the remote control unit after the tracking unit has been moved to a remembered position.

In another aspect of the present invention first means are provided to operate the controller to function in the stealth mode which includes operating the controller to move the tracking unit when the controller is not operative in the tracking mode to track the remote control unit; operating the controller by the first means in the stealth mode to move the tracking unit in the same direction and at the same speed as it was being moved in the tracking mode when the tracking mode becomes inoperative; and providing a second means to automatically return the controller to operation in the tracking mode from the stealth mode when the tracking mode becomes operative.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 8 is a block diagram of the PAN and TILT motor control circuitry;

FIG. 10 is a pictorial diagram of the position feedback indicating circuitry used in the present invention;

FIG. 11 is a plan view of the gray scale light blocking disk used in FIG. 10;

FIG. 12 is a simplified block diagram of the user interface used on the base unit of the present invention;

DETAILED DESCRIPTION OF THE PREFERRED EMBODIMENT

Figure 1:
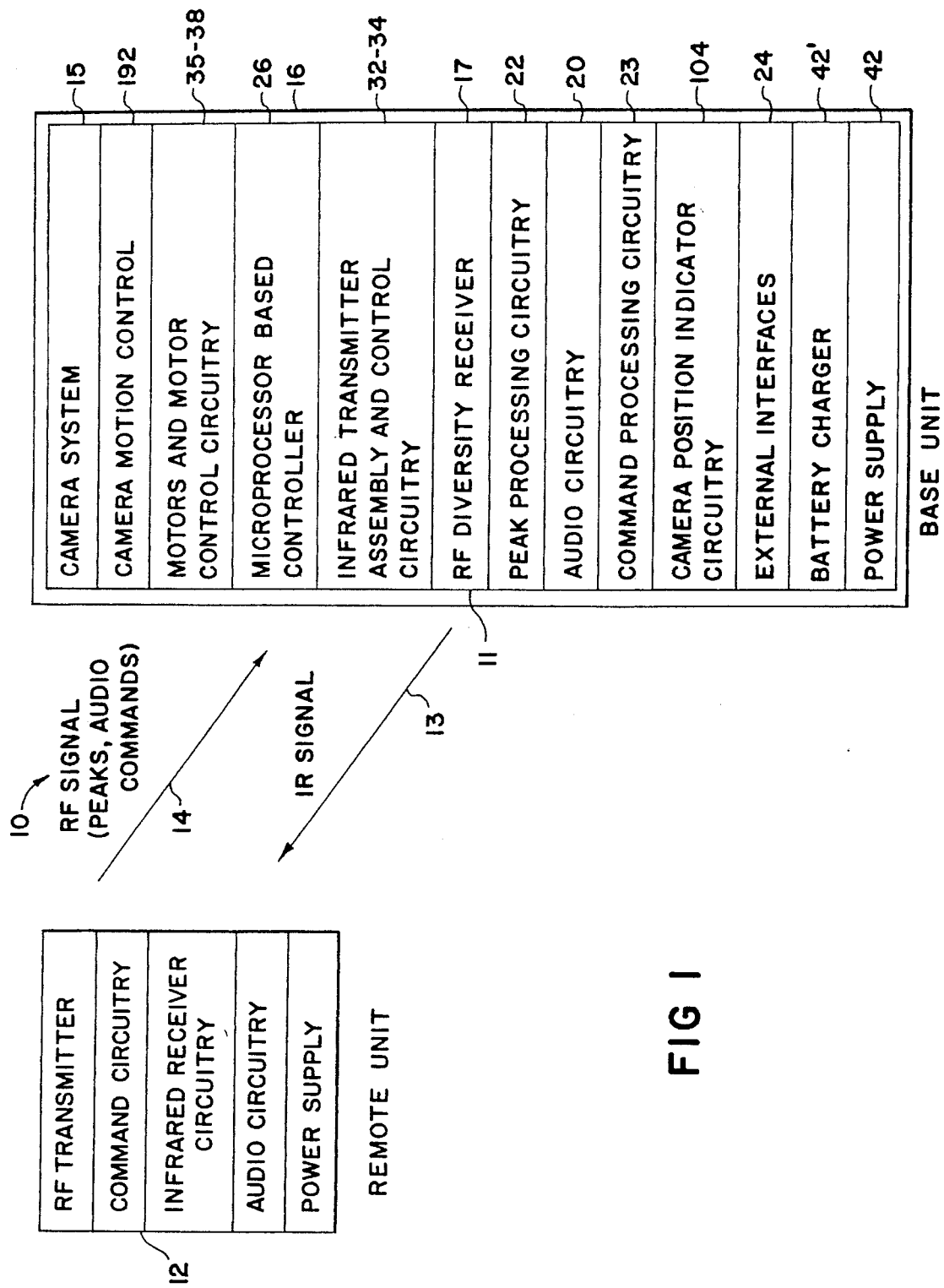
FIG. 1 is a simplified block diagram of the base unit and remote unit of the tracking system in accord with the present invention.

The present invention is a remote tracking system and method particularly for applications which require remote control of a moving picture camera such as video camcorders and still cameras. A brief review of the design and operation of the prior application Ser. No. 07/530,999 will be helpful in explaining the improvements described herein.

The base unit of the tracking system transmits an infrared signal through a rotating set of lenses or signal shapers designed to structure the IR beam in a predetermined process. The base unit includes a microprocessor which monitors indicating circuitry to calculate the error from exact alignment between the base unit and the remote unit wherein exact alignment is 0 degrees. The remote unit transmits an RF signal to the base unit containing information regarding the received IR signal, particularly the strength of the signal received in a given time frame. The base unit contains computational circuitry to calculate the location of the IR beam at the time of a "peak" reception by the remote unit with respect to a reference established by the base unit circuitry.

The improvements in the present invention include an improved RF receiver to receive RF signals from the remote unit. The improved RF receiver is a VHF space diversity receiver that greatly reduces the possibility of a loss of RF signal due to reflections as their is almost no chance that both of the two RF signal paths employed would be blocked at the same time.

The remote unit is in the form of a hand-held staff or rod elongate in shape that includes audio circuitry and the capability of utilizing either internally mounted IR sensors or a separate device that includes the IR sensors. The remote unit can transmit "Peak" signal data to the base unit as well as "Commands". Improved circuitry provides for the independence of PAN and TILT "Peaks" by comparison with prior levels as well as clear separation of Peak and Command signals.

The system also employs means to operate the camera controls which includes mechanical "fingers" that can be interfaced to the base unit control circuitry to operate ZOOM WIDE, ZOOM TIGHT, and CAMERA ON/OFF controls or buttons on the camera. The necessary finger motors and associated control circuitry is also included.

Other improvements include load-independent control of stall indicators for the PAN and TILT motors which turn off power to the respective motor during excessive lead conditions and an improved PAN and TILT position indicator employing a gray scale disk that rotates through an optical detection system to monitor position without a mechanical potentiometer that can become erratic with age and wears even when not being used.

The IR drive transmitter drive circuitry has been improved to provide a variety of power outputs to improve system response over greater range. The remote also contains a high/low power switch 135 to increase the operating range of the system without decreasing or degrading performance due to ancient electrical noise.

The audio circuitry of the remote includes compressor circuitry to prevent loud audio picked up by the microphone from overdriving the camera audio circuits or interfering with the Peak/Command circuits. The RF transmitter in the remote and receiver in the base unit are both designed for two-channel operation.

With reference now to the drawings, a simplified block diagram of the improved remote tracking system is illustrated generally at 10. Base unit 11 tracks a remote unit 12 which is preferably a hand-held, rod-like unit which includes a microphone and associated FM audio circuitry as will be explained in greater detail hereinbelow. The base unit transmits an infrared (IR) signal 13 which is detected by the remote 12 which in turn transmits to tho base 11 an RF signal 14 containing data as will be discussed. The base unit 11 includes a camera system 15 and other circuitry and systems contained in a housing 16. The base 11 is mounted on a tripod or table top.

One major improvement in the present invention is a space diversity receiver 17 which will greatly enhance the reliability of the RF link between the remote 12 and the base unit 11. This type of design will help to minimize the effect of reflections from nearby objects that can cause the signal to be lost. There is virtually no chance that the signal would be lost in both receivers at the same time, as will be discussed. The other subsystems of the remote 12 and base unit 11 will be discussed separately.

Figure 2:
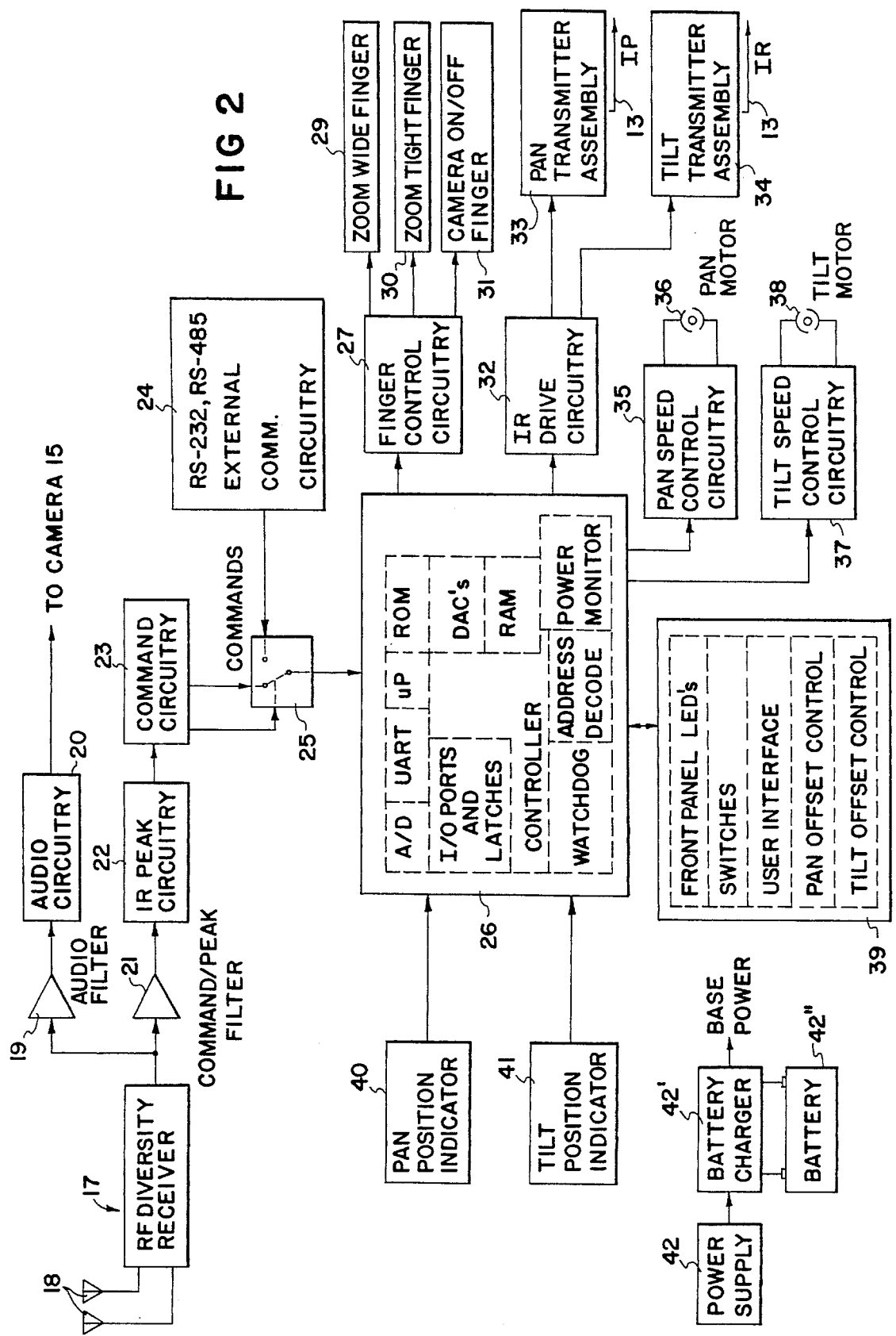
FIG. 2 is a detailed block diagram of the base unit of FIG. 1.

FIG. 2 is a block diagram of the base unit 11. RF diversity receiver 17 receives a signal via two antennas 18 and provides an output to audio filter 19 and command/peak signal filter 21. Audio output from audio circuitry 20 is sent to the camera 15 sound system. Command and Peak signal data that is filtered via circuit 21 is provided to IR Peak circuitry 22 and Command circuitry 23 that sorts out "Peak" signals from "Command" signals transmitter by remote 12 as will be discussed in greater detail herein. The electronic switch 25 directs remote commands to microcomputer controller 26 which can also receive data from a standard external communication circuit interface 24.

Figure 6:
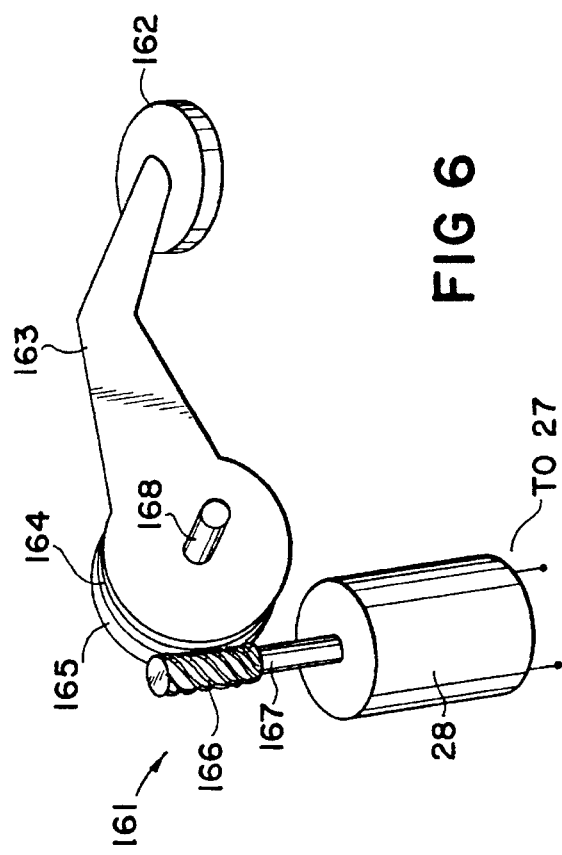
FIG. 6 is a pictorial diagram of a mechanical finger in accord with the present invention.

The microprocessor-controlled controller 26 provides output signals to finger control circuitry 27 which directs output signals to three mechanical fingers mounted on the motion picture camera 15: ZOOM WIDE finger 29; ZOOM TIGHT finger 30; and CAMERA ON/OFF finger 31 each of which has an associated finger motor 28 (FIG. 6). Controller 26 also provides outputs to IR drive circuitry 32 which controls the PAN and TILT transmitter assemblies 33, 34 respectively.

Another improvement in the present invention is the PAN and TILT motor control circuits 35, 37 which drive motors 36 and 38 and include stall indicators that will be described with regard to FIG. 9. Circuit block 39 includes switches and controls that will be described in connection with their respective functions. The PAN and TILT position indicators 40 and 41 employ an advanced position indicating system discussed under FIGS. 10 and 11. The power supply 42 preferably includes a battery charger 42' and battery 42" that "floats" on the charger 42'. The power supply 42 provides for system power as well as a recharge of battery 42" simultaneously. If the current draw of the base unit 11 exceeds the capacity of power supply 42, battery 42" will provide the balance. Conversely, if unit 11 draws less than power supply 42 can provide, battery 42" will be recharged.

Figure 3:
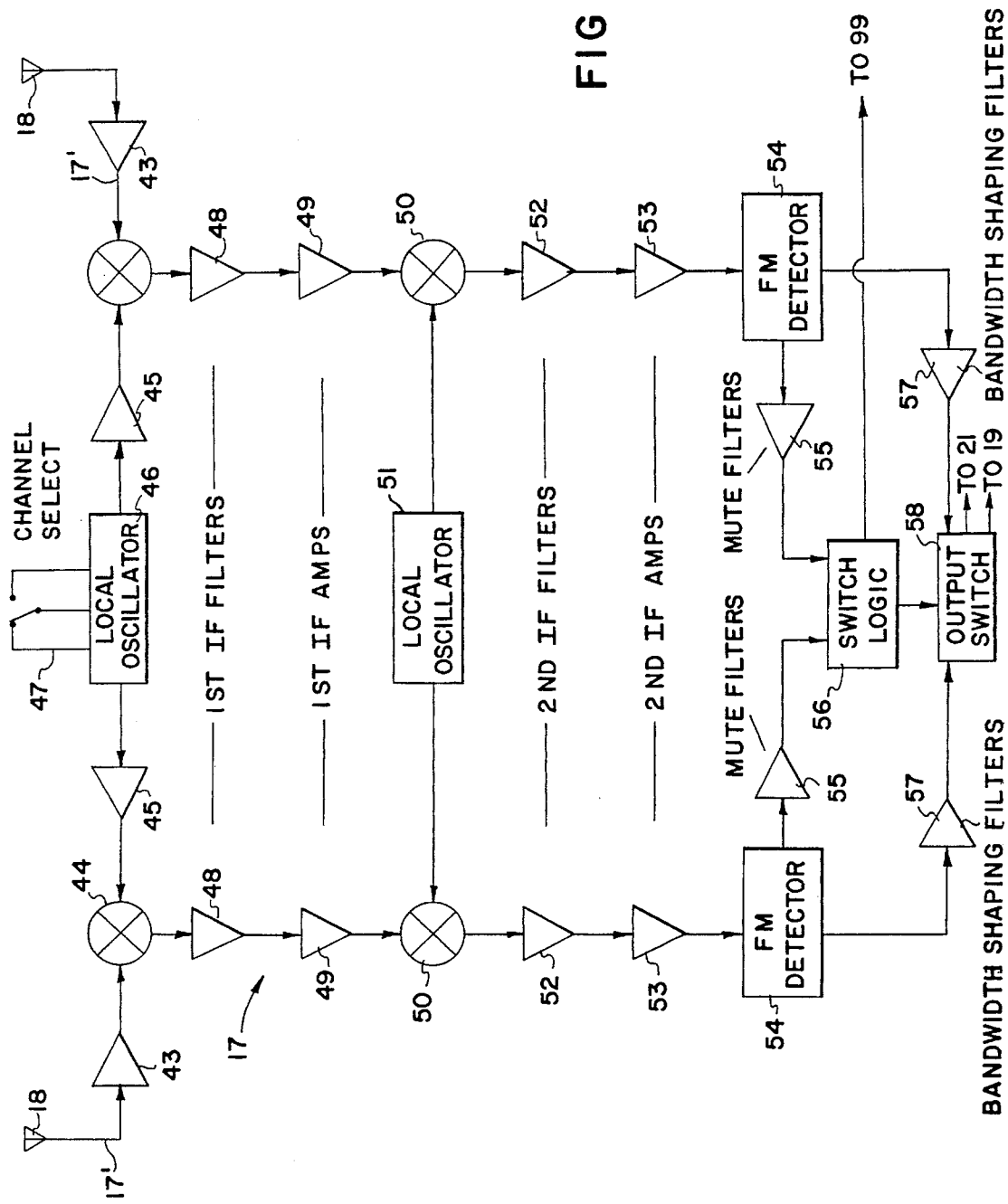
FIG. 3 is a detailed block diagram of the space diversity receiver of FIG. 2.

FIG. 3 is a block diagram of the VHF space diversity receiver 17. Each receiver section 17' is a dual conversion FM receiver. The total gain of each receiver section 17' is approximately one million and is too high to be accomplished at one frequency. Accordingly, two IF frequencies of 10.7 mhz and 455 khz were chosen.

RF signals 14 are received at the spaced antennas 18 which provide inputs into the RF amplifiers 43 and from there the signal is applied to mixers 44. Mixers 44 also receive inputs from frequency triplers 45 fed by local oscillator 46 which also provides for two-channel operation, Ch A and Ch B, via a CHANNEL SELECT switch 47. Mixers 44 provide outputs at 10.7 mhz to 1st IF filters 52 and 2nd IF amplifiers 53. FM detectors 54 provide outputs to noise responsive circuitry including mute filters 55 which look for high frequency noise that is considered evidence of a "weak" signal. When the noise level exceeds a predetermined threshold level provided by the switch logic 56 the switch logic 56 will direct the input signal which is "best" through output switch 58. The output signal itself is provided from FM detectors 54 through bandwidth-shaping filters 57 which compensate for the frequency response of the transmitter and receiver and yield a output bandwidth of 10 hz to 8 khz. From output switch 58 the signal contains (1) 3.5 khz bandwidth audio, (2) an 8 khz IR Peak signal, and (3) 8 khz Command signals. The Peaks and Commands are interleaved during transmission at the remote 12. Switch logic 56 also provides a signal indicating that a valid RF carrier is present to the controller 26.

The components of diversity receiver 17 are all well known in the art and are matched to provide nearly identical frequency response and performance of each receiver section 17'.

Figure 4:
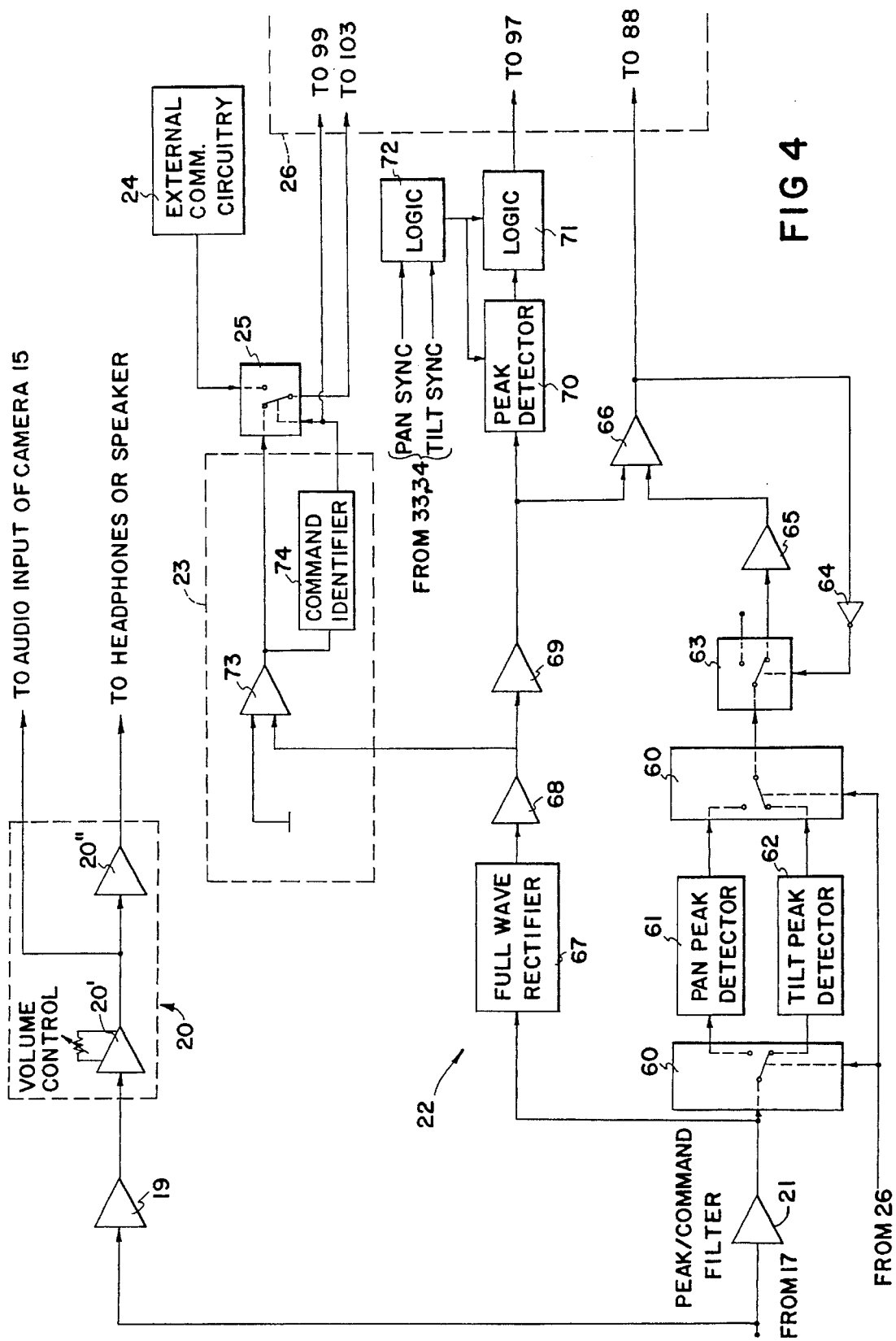
FIG. 4 is a detailed block diagram of the audio and Peak/Command signal circuitry of FIG. 2.

FIG. 4 illustrates the signal processing circuitry used to process the signal output from the diversity receiver 17. The outputs from output switch 58 of receiver 17 are sent to the audio circuitry which includes a sharp roll-off 3.5 khz low pass filter 19 to provide a 100 db attenuation of the 8 khz Peak and Command signals from the input. The signal is now a pure audio signal that is provided to a standard audio amplifier 20' and low impedance output driver 20" as understood in the art. The audio signal is provided to the audio input of camera 15 and can be monitored via a separate headphone.

The Peak/Command output signal from receiver 17 is separated from audio at the 8 khz, high Q bandpass filter 21 which provides an output to full wave rectifier 67 and to electronic switch 60 which is wired across PAN peak and TILT peak detectors 61 and 62 respectively.

Comparator 66 receives one input from the rectifier 67, amplifier 68 and another input from low pass filter signal path of the electronic switch 63, inverter 64 and filter 65.

When the Peak/Command signal contains "Peak" information, the Peaks are rectified, amplified, and filtered. This data is compared to prior Peak level data via a "sample and hold" function achieved by switch 63 and low pass filter 65. This circuit keeps the comparison level constant during the Peak pulse time. This scheme makes PAN and TILT levels independent. For example, a low level PAN peak that is preceded by a high level TILT peak will be correctly identified as such. The comparator 66 provides an output to controller 26 for a time interval equal to the length of time a given Peak signal is greater than a predetermined percentage of its previous level. This signal is provided as an INTERRUPT to controller 26. Peak signal data is also provided to Peak detector 70 which outputs to "sample and hold" logic 71 to provide data to the controller 26 regarding the highest level that the Peak signal achieves during a particular scan. "Dump" logic 72 dumps this data at the end of a scan in response to SYNC data from PAN and TILT transmitter assemblies 33 and 34 that is derived from the tab position detection done at the rotating assemblies. The lens assembly position indicators, it will be recalled, provide "leading edge" and "trailing edge" signals to the controller 26 which function as "SYNC" pulses in order to measure the scan time interval in counts from clock circuitry in the controller.

With regard now to "Command" signals, COMMAND signals are preceded by a "preamble" that is longer than the longest allowable Peak pulse. If a Command starting sequence is detected at comparator 73, the command identifier provides an output to electronic switch 25 to direct remote commands to the controller 26. External communications via circuitry 24 are automatically overridden by remote commands via the command identifier 74.

Figure 5:
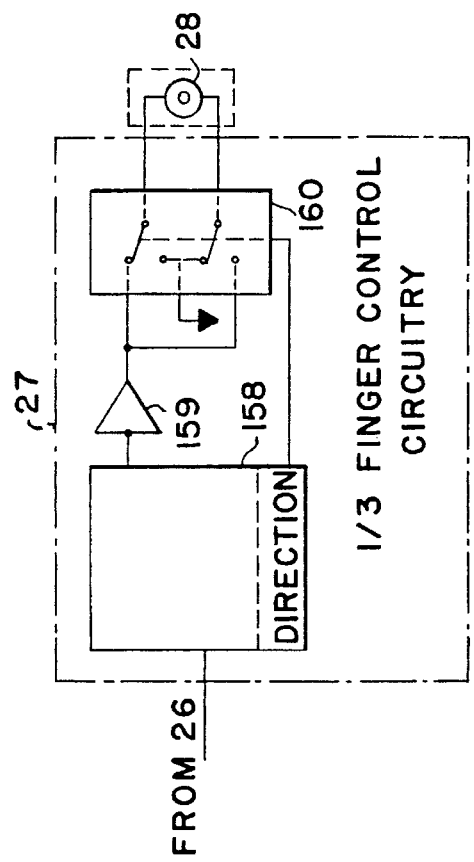
FIG. 5 is a block diagram of a finger motor and motor control circuitry.

FIG. 5 illustrates the circuitry for the control of a finger motor 28. One-shot multivibrator 158 provides outputs to driver 159 and to direction control switch 160 for motor 28. Each of the fingers 29, 30, 31 uses a motor 28 actuated by a signal from controller 26 to press the finger 29–31 down as long as the signal is present. When the signal from controller 26 stops, one-shot 158 provides a signal to the motor 28 to reverse its direction for a predetermined period to lift a finger 29–31 from the associated button on a camera 15.

FIG. 6 illustrates the preferred embodiment of each finger 29, 30, 31 for operation of ZOOM WIDE; ZOOM TIGHT; CAMERA ON/OFF respectively (see also FIG. 2). Each finger assembly 161 includes a finger pad 162 that resets against the control switch on a camera 15. A finger arm 163 is formed as a lever and connects to a slip clutch 164 mounted on worm gear 165 driven by worm drive 166. Drive 166 is connected by a shaft 167 to a finger motor 28. The assembly includes a shaft or axle 168 for pivotal movement of the assembly 161 to housing 169 which removably attaches to a camera 15. Pad 162 is swivel mounted on arm 163 in order to insure a solid mechanical contact with a camera button.

Figure 7:
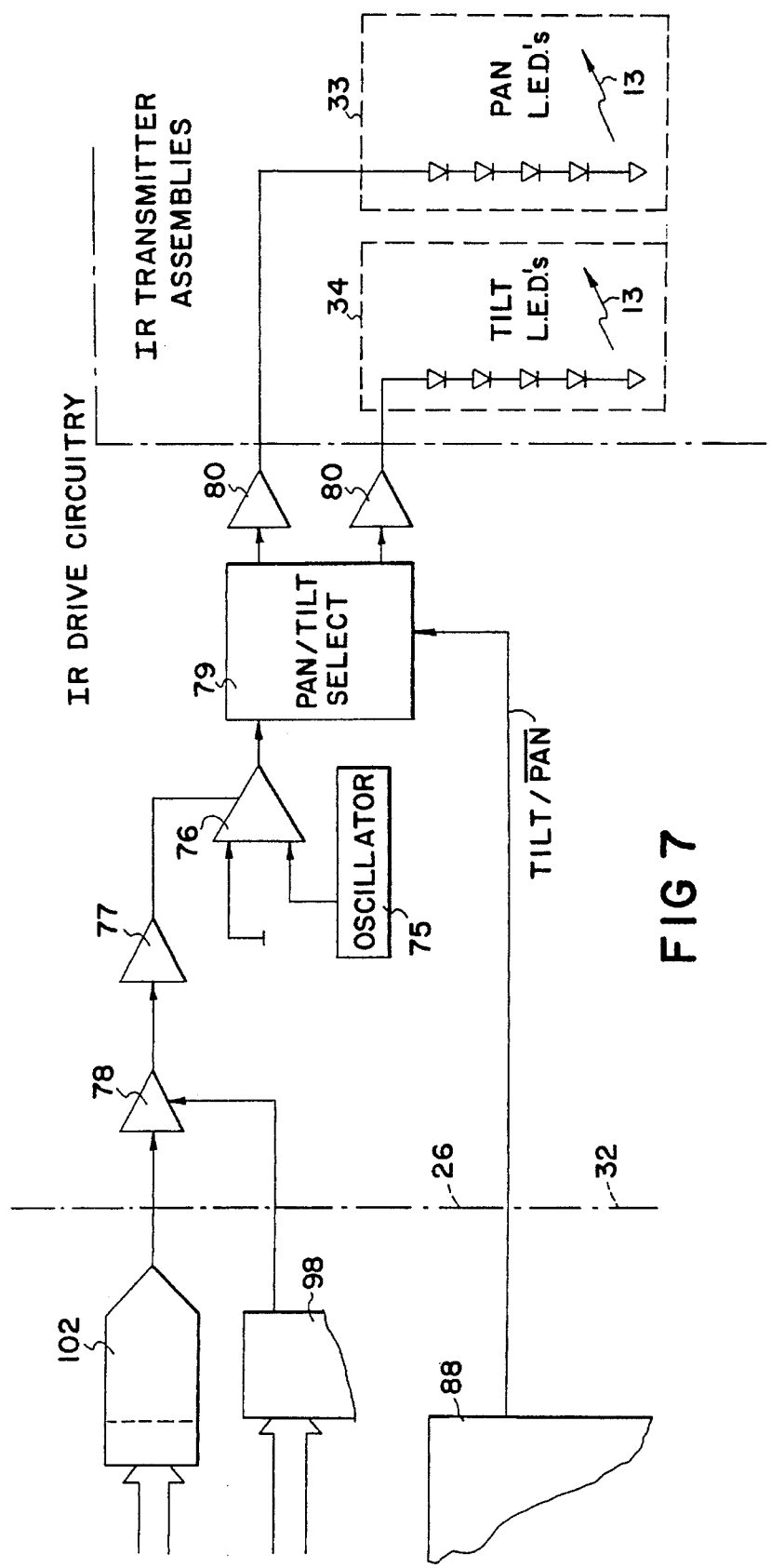
FIG. 7 is a block diagram of the IR drive and transmitter system.

FIG. 7 illustrates the IR drive circuitry 32 and associated transmitter assemblies 33, 34. Controller 26 provides a range of output signals from a digital-to-analog converter (DAC) 102 and output latch 98 to amplifier 78 which includes a high/low output select line from latch 98. Recall from the discussion of FIG. 4 that peak detector 70 provides an output to controller 26 which contains data regarding the peak level received by the remote 12 (which will be discussed in greater detail hereinbelow). Both the high and low output select can be subdivided into 255 divisions via DAC 102. Controller 26 can thus regulate the output power to provide good "Peak" signals in accord with the system software.

Amplifier 78 provides an output to low pass filter 77 which outputs a gain control voltage to variable gain amplifier 76 which receives the output of oscillator 75. PAN/TILT select logic 79 is controlled by the microprocessor 88 in controller 26. The select logic 79 is connected to the PAN and TILT transmitter assemblies via high current drivers 80.

FIG. 8 illustrates the motor control circuitry. The drive motor speed for the PAN and TILT motors 36, 38 is set by signals from the DAC's 100, 101 run by the controller 26. Differential amplifier 81 provides an output to the chopper drive circuit 83 and an input from filter 82 via "sample and hold" logic 85 which provides an average "back EMF". The chopper drive 83 can change both frequency and duty cycle to provide exact motor control via motor driver 84. This provides load-independent control to accommodate cameras 15 of a different weight. Direction control switch 87 receives a signal from controller 26.

Both PAN and TILT motor control circuits 35, 36 contain current monitors 86 which provide an input to controller 26 which will then provide a motor turn off in the event a motor 36, 38 stalls. The stall condition will be cleared when the motor 36, 38 moves in the opposite condition. Stall may result if housing 16 were to encounter an obstacle such as a wall or other object.

Figure 9:
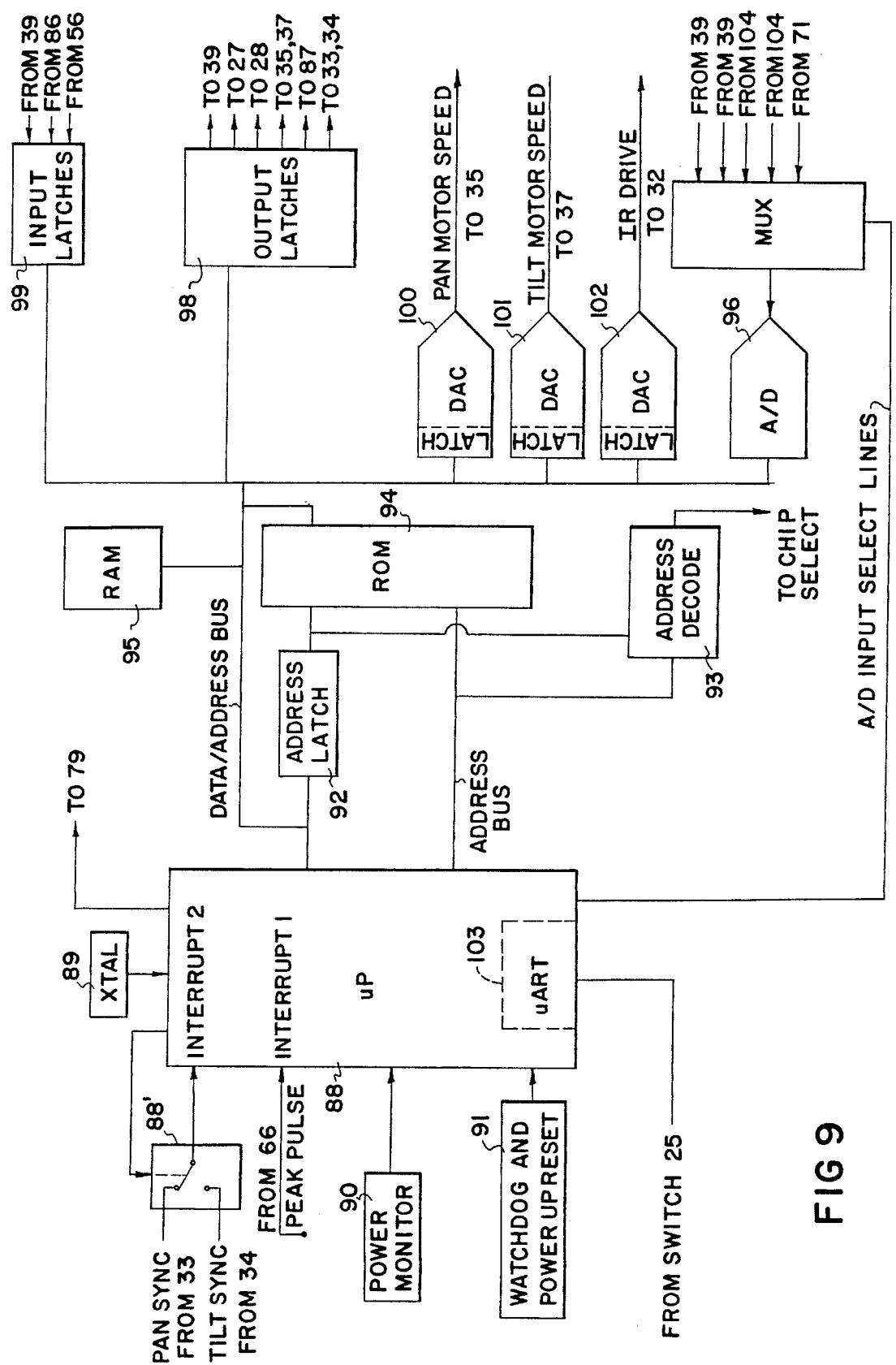
FIG. 9 is a detailed block diagram of the microprocessor-based controller of the present invention.

FIG. 9 illustrates a block diagram of the controller 26. Controller 26 is a microcomputer-based system employing a standard 8-bit microprocessor 88 which employs the usual crystal 89 and includes power monitor 90 and watchdog and power up reset circuit 91 for monitoring its performance. The microprocessor 88 includes all the usual interface circuits such as address latch 92, address decode 93, ROM 94, RAM 95, A/D converter 96, multiplexer 97 and output and input latches 98, 99 respectively. There are also three DACs 100, 101, 102 for PAN motor speed, TILT motor speed, and IR drive 32 respectively and a standard UART 103 for communication. Input latches 99 receive input from command identifier 74 to indicate communication select indicator of remote 12 or external circuitry 24; user switches 39; stall data from indicator 86; and RF carrier detection from switch logic 56. Output latches 98 interface to front panel LEDs 39; finger down data to finger control 27; IR drive high/low to amplifier 78; PAN/TILT motor enable data to controllers 35, 37; motor direction data to switch 87; and transmitter motor enable data to assemblies 33, 34. Multiplexer 97 receives data from logic 71; PAN/TILT position indication, OFFSET controls, and tracking style which will be discussed.

Microprocessor 88 receives PAN sync and TILT sync data from the beginning and end of scan signal edges at INTERRUPT2 via switch 88' and Peak pulse data from comparator 66 at INTERRUPT1 to determine the position of the remote 12 relative to base 11 via the system software.

FIGS. 10 and 11 illustrates an improved position-indicator for providing data on the position of the PAN and TILT mechanisms which control movement of the camera 15. The position feedback indicator circuitry 104 includes filter 105 which receives an input from amplifier 106 and provides an output signal to controller multiplexer 97. An emitter 108 provides a light signal to linear detector 107 which provides an output to amplifier 106 based upon the strength of the light passing through a plastic gray scale disk 109. The gray scale disk 109 is illustrated in FIG. 11 and includes a ring of light-blocking material 110 embedded therein and which varies linearly in scaled steps in opacity with angular position in a manner known to the computer software. The major advantage of the present invention is the absence of any mechanical contacts such as those in ordinary potentiometers that can become "scratchy" and erratic over a period of time with the resultant errors that arise.

The disk 109 can fit either on the shafts of motors 36 and 38 (or 53 and 54 of FIG. 13 of the C-I-P application) or it can be placed on the associated gearing or fixed members of the assembly as convenient in the circumstances. The software in the present invention needs only the movement from a reference position established in the software itself to operate and calculate the change in position. Such position feedback data can be used in proportional or other control methods for motors 36, 38 as desired in the circumstances and can be used to establish PRESET reference positions usable with command software.

Figure 13:
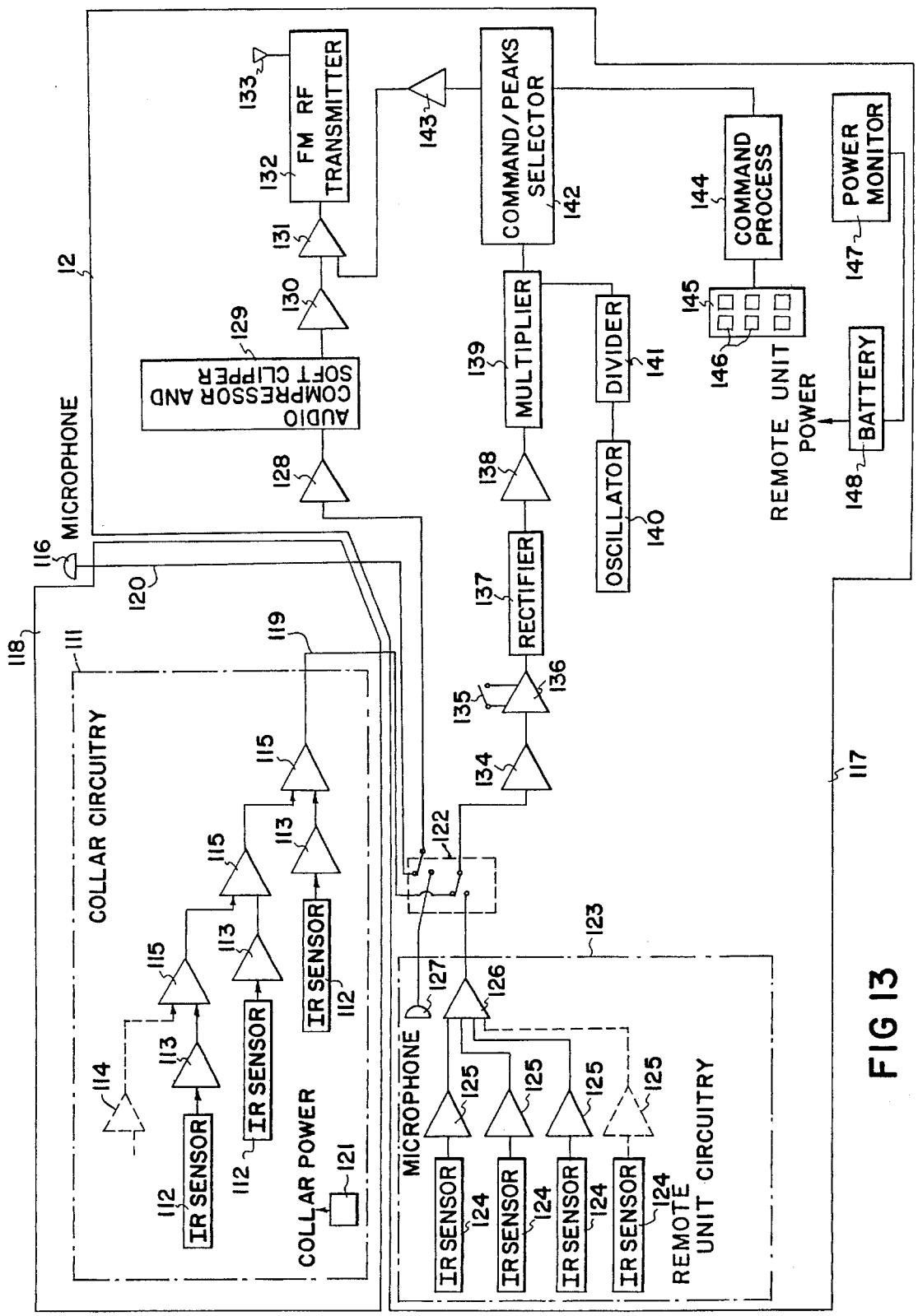
FIG. 13 is a block diagram of the remote unit of FIG. 1 configured as a hand-held remote unit.
Figure 14:
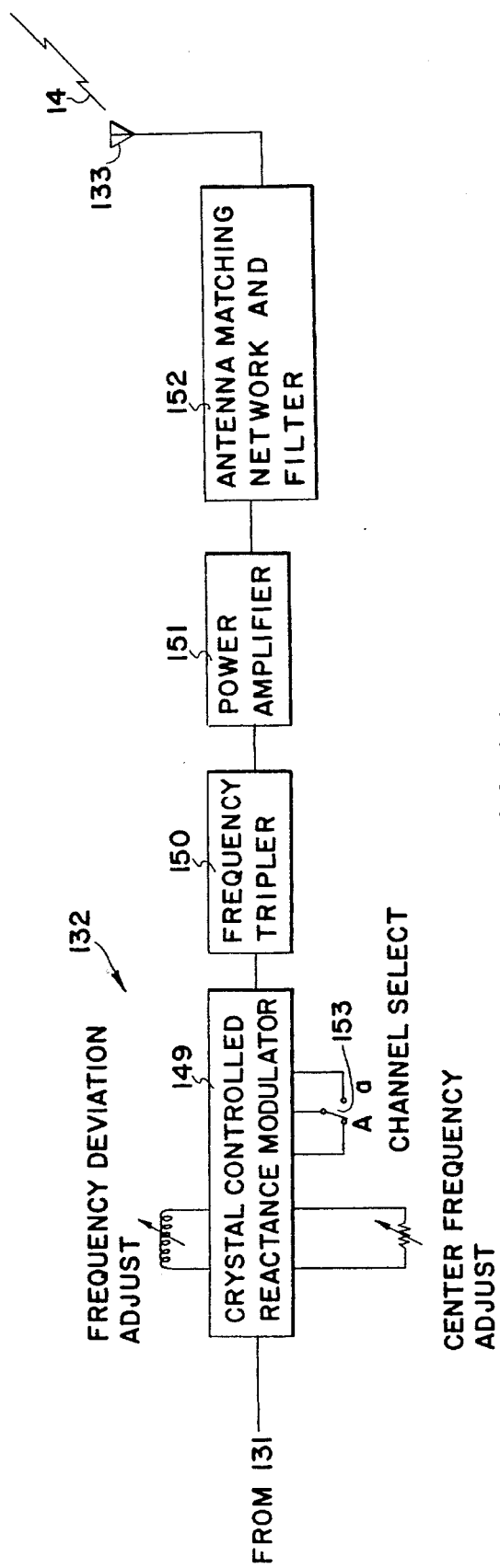
FIG. 14 is a block diagram of the RF FM transmitter used in the remote unit of FIG. 13.

With respect now to FIGS. 13 and 14, the remote unit 12 is illustrated in block diagram form. In the preferred embodiment of the present invention, the remote unit 12 is in the form of a rod-shaped staff that can use either (1) built-in IR sensors and a microphone or (2) external IR sensors and microphone. The collar circuitry 111 represents the preferred external configuration and includes a plurality of IR sensors 112, IR amplifier/filters 113 and summer amplifiers 115 (with amplifier 114 representing an additional number of circuits as may be desired in the circumstances). Collar 111 is worn around the neck for hands-free operation and includes a standard microphone 116 in a housing 118 and is connectable to the main remote 12 circuitry 123 via leads 119, 120. Collar 111 may also include a separate battery 121 or receive power from the unit 12.

Remote circuitry 123 also includes a plurality of IR sensors 124 with amplifier/filters 125 feeding summer 126. The remote circuitry 123 is fitted within housing 117 and includes built-in microphone 127. Switch 122, constructed as a conventional jack, is utilized to switch between collar 111 or remote circuits 123 as desired.

Regardless of whether collar circuitry 111 or remote circuitry 123 is utilized, the audio signal is sent first to microphone preamp 128 and then to signal level limiting circuitry including audio compressor and soft clipper circuit 129 which limits any high or loud audio picked up to below a specified level so that bursts of sound do not interfere with Peaks and Commands or overdrive the audio input of a camera 15. Audio compressor 129 also includes automatic gain control so that the position of the remote 12 is not critical to the audio source. The signal is then sent to low pass filter 130 and from there to sunder 131 which provides a bandwidth-limited signal to FM RF transmitter 132 for broadcast via antenna 133.

The summed IR signal output is sent to bandpass filter 134 and then to an amplifier 136 with two gain settings selectable via switch 135. The output of amplifier 136 is rectified by rectifier 137 and applied to low pass filter 138 and a remodulator consisting of frequency multiplier 139, oscillator 140 and divider 141. The bandpass filter 134 is tuned to the same frequency as the IR drive output oscillator 75 in base unit 11 (FIG. 7). The filter 134 output is amplified at a gain selected by switch 135. Greater amplification is needed for operation at greater distance of the remote 12 from the base unit 11. The IR signal is then rectified and filtered again. This signal is now remodulated on a carrier of frequency determined by oscillator 140/divider 141 of the remote. This arrangement allows higher IR output frequencies (32 khz) to be transmitted to the remote 12 by allowing the returned signal to base unit 11 to be at a lower frequency inside the RF channel bandwidth (8 khz).

Command circuit means includes the command processor 144 to scan the switch means, which includes a keypad 145, to determine if a button 146 has been pushed. Keypad 145 is wired with command processor 144 to selectively provide a series of predetermined command signals from the processor 145. If operation of a button 146 is detected, the command processor 144 provides an output to Command/Peak Selector 142 to switch to the "Command" mode from the normal "Peak" mode thereby putting the Command to summer 131 via bandpass/clipper 143. Power monitor 147 provides data to the command processor 144 on low output from battery 148 with the result that a LED on front panel 39 will be actuated to flash.

The RF FM transmitter illustrated in FIG. 14 is a true frequency modulated system employing a crystal-controlled reactance modulator that steers the output voltage in accordance with the voltage variations from summer 131. Channel selector 153 allows for two channel operation in conjunction with switch 47 on the diversity receiver 17 (FIG. 3). Frequency tripler 150, power amplifier 15, and impedance matching circuitry are all known in the art and complete the circuit to antenna 133.

FIG. 12 illustrates some of the controls and indications available to the user at the base unit 11. Front panel LEDs 157 indicate the following: (1) base unit power; (2) remote power; (3) PAN peaks present; (4) TILT peaks present; (5) tracking enabled; and (6) subject centered. Those LEDs 157 used for power monitoring will flash under low power conditions. Switches 156 allow the user to change certain system parameters for: (1) tracking style or sensitivity; (2) OFFSET POTENTIOMETER CONTROL ENABLE; and (3) REMOTE UNIT DISABLE.

Potentiometers 154 and 155 are that allow for PAN offset control and TILT offset control. The output from pots 154 and 155 is directed to controller 26 via multiplexer 97. Normally, the software associated with the present system 10 provides that the remote unit will be "centered" in the frame of the camera 15 when tracked (and so indicated on an LED 157). Inputs from pots 154, 155 will alter the error signal in controller 26 to "offset" the center of the frame a fixed amount as desired. This feature can be used in correcting for different lens alignment in different cameras.

Figure 15:
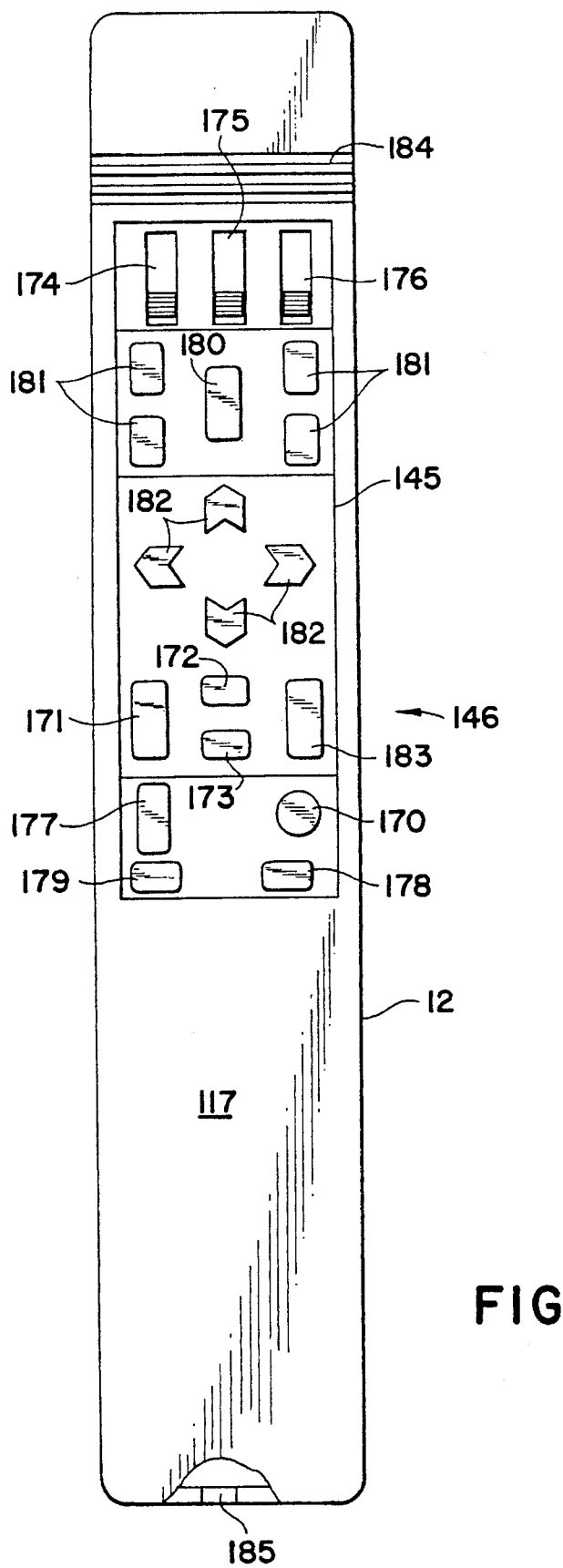
FIG. 15 is a front elevational view of the preferred embodiment of the remote unit in accord with the present invention.

FIG. 15 illustrates the preferred embodiment of the remote 12 used in accord with the present invention. The command keypad 145 includes a plurality of keys 146 for an expanded group of command functions. (1) START/STOP button 170 is used for the camera ON/OFF function or shutter release on a still camera 188 (FIG. 17. 2) AUTO TRACK button 171 is used to set automatic tracking ON/OFF. (3) REMOTE POWER is controlled on/off by button 174. (4) MIC POWER is controlled by button 175. (5) FILTER button 176 is used for control of gain via switch 135. (6) Zoom rocker switch 177 is used to control ZOOM WIDE and ZOOM TIGHT for the camera 15 ZOOM lens. (7) SET and RESET buttons 178, 179 are used with automatic ZOOM lens control. (8) LOCATION PRESET buttons 181 are used with the optical position indicators 104 to set four locations of PRESET via set switch 180. Four LOCATION PRESET buttons 181 are used to set four locations into memory by aiming the camera 15 or 188 using PAN/TILT OVERRIDE buttons 182 at a particular spot. Then, a button 181 is pressed followed by the pressing of SET button 180. The data from optical position indicators 104 at the selected presets is then stored into the memory of controller 26 and can be recalled by depressing the appropriate button 181. The recall to a preset location will automatically override the tracking function and position the base unit 11 according to the stored data. The camera 15 can then be operated as desired. (9) The PAN/TILT OVERRIDE buttons 182 are used for manual control of respective functions with FAST and SLOW switches 172, 173. (10) the STEALTH ON/OFF button 183 is used with a STEALTH function for cases when a user will walk behind a barrier that will break IR communication between remote 12 and base unit 11. As explained previously, the RF return signal 14 includes data regarding the "Peaks" for the received PAN and TILT signals 13. When STEALTH button 183 is operated "on", a COMMAND signal is sent to base unit 11 which, via stored software, will provide that the base unit 11 will continue moving at the same rate and in the same direction if and when a PAN or TILT (or both) "Peak" signal is lost indicating that remote 12 is shielded from the scanning signal 13 by an obstruction. Circuit data on movement direction and speed is stored in the memory circuits of controller 26. When the lost Peak signal is regained, the base unit 11 will resume normal tracking.

Figure 16:
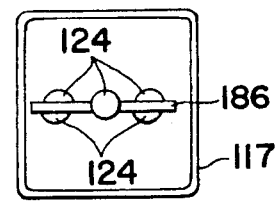
FIG. 16 is a diagrammatic illustration of the omnidirectional capability of the remote unit of FIG. 15.

Further details of the remote 12 include "grill" 184 in front of microphone 127 (not shown) and the omnidirectional nature of remote reception illustrated in FIG. 16. The particular orientation of the remote 12 will not affect communication between remote 12 and base unit 11. This design feature is quite desirable for a hand-held remote unit 12 as in accord with the present invention. IR sensors 185 can be installed on the bottom of remote 12 if desired to further improve the omnidirectional reception thereof.

Figure 17:
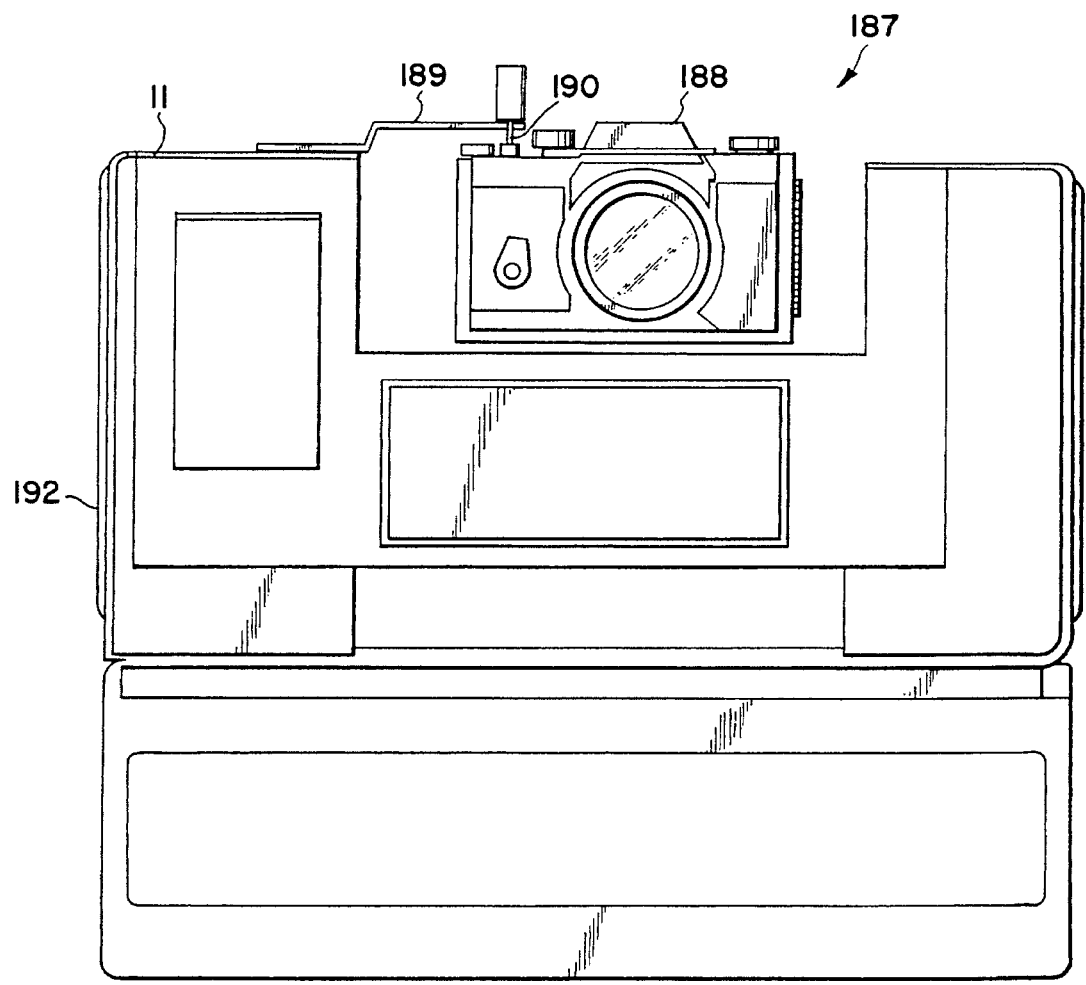
FIG. 17 is a pictorial illustration of the base unit in accord with the present invention having a still camera mounted thereon.

FIG. 17 illustrates the use of the tracking system 187 in operating a still camera 188 mounted on base unit 11 operated by a mechanical finger 189, finger 189 being substantially identical to fingers 161 for operating the actuating means of the camera 188. Finger 189 operates the shutter via a shutter release button 190 as understood in the art.

With further regard to the use of fingers 161, 189, it is to be noted that base unit 11 can be interfaced directly into the electronic controls of a camera 15 or 188 to operate the associated functions directly. In the present invention, base unit 11 is designed to accommodate a wide variety of cameras of all types.

The present invention includes features for improved use of the devices such as collar 111 which is designed to be worn around the neck, a part of the body which moves the least and accordingly will provide a more "stable" target for the base unit 11. The software will also provide for no movement of the tracking unit unless the remote unit 12 is moved more than 5 degrees back and forth through the aligned reference, defined as 0 degrees, and remains in position for more than 1 second. This prevents "jumpy" movement of the base unit when the user is someone who "talks with their hands" and moves the remote unit slightly and quickly during operation. Furthermore, the system can determine the distance between base unit 11 and remote unit 12 by having the controller 26 determine the output power provided by the LEDs in transmitters 33 and 34 to maintain a constant level of "Peak" signal received by remote 12 as distance changes. Data indicative of the Peak level is included in the return signal 14 from the remote 12 and processed via Peak detector 70, as discussed hereinabove. This provides a relative distance measurement.

The particular types of tracking style or sensitivity involves setting via switch 156, the amount of error needed to cause the tracking unit 11 to be moved by the controller 26 (1) in terms of the error itself; or (2) having the controller 26 look for a "trend" in the error signal before unit 11 is to be moved. In the preferred embodiment of the invention, the resolution of the system is 0.016 of a degree which provides for accurate tracking but the system software can require larger errors to be present before base unit 11 movement, if trending is chosen via switch 156. This method involves increasing the trend error needed to move the base unit 11 to 5 degrees.

Also, as illustrated in FIGS. 15–16, the audio microphone behind grill 184 is located adjacent IR sensors 124 to encourage a proper vertical orientation of the remote when it is held by a user to insure proper orientation of sensors 124 which will improve communication between the base unit 11 and remote 12.

Figure 18:
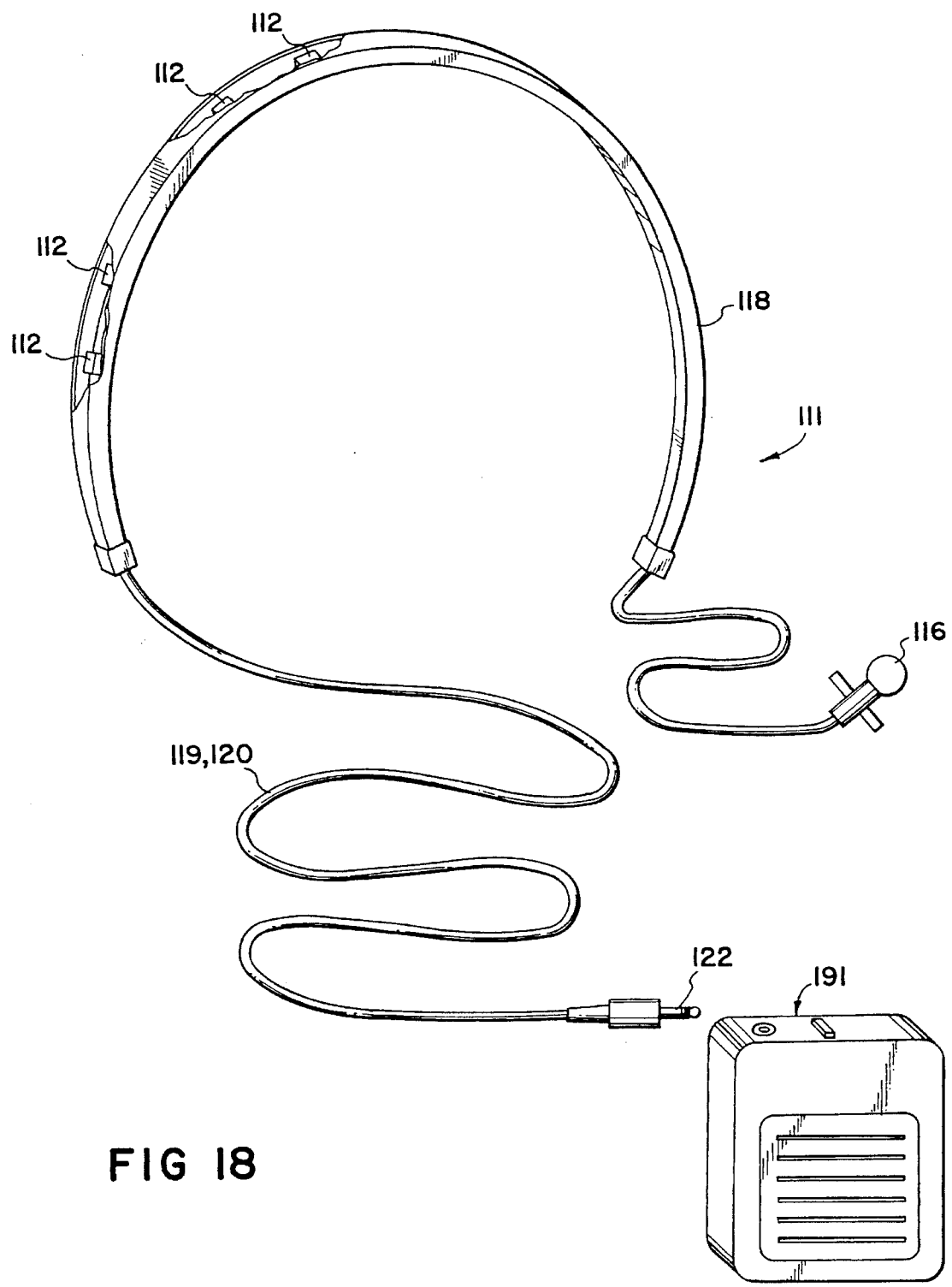
FIG. 18 is a pictorial illustration of the remote unit formed as a collar in accord with the present invention.

Finally, the collar device 111 is illustrated in FIG. 18 in its preferred embodiment. Transmitter and power pack assembly 191 doubles as the remote 12 output circuitry illustrated in FIG. 13 and can be placed in a user's pocket. IR sensors 112 are spaced in housing 118 to provide omnidirectional sensing and clip-on microphone 116 is conventional in the art.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed and what it is desired to secure by Letters Patent of the United States is:

1. A remote-controlled tracking system for tracking a movable remote control unit comprises a base station, said base station including control circuit means for automatically determining the relative position and movement of said remote control unit with respect to said base station and providing control output signals in response thereto, said base station including movable means responsive to said control circuit means for moving said base station in response to said control output signals, said remote control unit including command circuit means for selectively providing a STEALTH command signal to said control circuit means, said control circuit means being responsive to said STEALTH command signal to automatically move said movable means when said tracking mode is inoperative as automatically determined by said control circuit means.

2. A method of positioning and operating a camera by a controller to automatically track a target with a field of view of the camera, comprising the steps of:

A. associating a camera with a tracking unit that is movable by tracking commands from the controller to track a target in at least one plane;

B. issuing a command to the controller to cease positioning of the field of view of the camera to track the target while continuing to determine a relationship of the target with the field of view; and C. stopping by the controller the tracking of the target.

3. The method of claim 2 including the steps of:

D. issuing a command to the controller to resume positioning of the field of view of the camera by the controller; and E. tracking and positioning the field of view to track the target by the controller.

4. The method of claim 2 wherein step C includes the step of:

D. connecting a computer to the controller operable to send commands to override the tracking commands from the controller.

5. A method of positioning and operating a camera mounted on a tracking unit that is movable by a controller to automatically track a target by the camera comprising the steps of:

A. mounting a camera having a ZOOM LENS function and having a ZOOM control for operating the ZOOM function on a tracking unit movable by the controller in at least one plane;

B. attaching operation control means to the camera for operating the ZOOM control of the camera in response to commands from the controller; and C. issuing by the controller commands to the operation control means to operate the ZOOM control of the camera.

6. A method of positioning and operating a camera mounted on a tracking unit that is movable by a controller to automatically track a target by the camera comprising the steps of:
- A. mounting a camera on the tracking unit that is movable by the controller in at least one plane;
- B. determining the position of the tracking unit;
- C. generating an output signal indicative of the position of the tracking unit to the controller;
- D. remembering by the tracking unit at least one position of the tracking unit;
- E. determining by the tracking unit the remembered positions obtained in step D;
- F. discontinuing the tracking of the target and moving the tracking unit to a position remembered in step D; and
- G. resuming tracking of the target after the tracking unit has been moved to a remembered position in step F.

7. A method of positioning and operating a camera by a command-driven controller having memory to automatically track a target comprising the steps of:
- A. associating a camera with a tracking unit that is movable by the controller to be movable in at least one plane;
- B. providing to the controller by the target signals to operate the controller;
- C. receiving signals provided by the target;
- D. integrating tracking commands from the controller with the automatic tracking capability of the tracking unit for altering the automatic tracking capability;
- E. generating by the controller data containing information regarding the position of the tracking unit; and
- F. issuing by the target a first signal to the controller to place the information regarding the position of the tracking unit into the memory of the controller.

8. The method of claim 7 further including the steps of:
- G. issuing by the target a second signal to the controller to move the tracking unit in response to the information placed in memory in step E; and
- H. moving by the controller the tracking unit in accord with the second signal.

9. A method of positioning and operating a camera by a controller to automatically track a target by the camera comprising the steps of:
- A. moving the target to a first position and automatically tracking the target in subsequent movement thereof;
- B. integrating tracking commands from the controller with the tracking capability of the controller for altering the tracking capability;
- C. remembering the first position; and
- D. instructing the controller to cease automatic tracking of the target and move to the first remembered position.

10. The method of claim 9 further including the step of:
- E. instructing the tracking unit to resume automatic tracking of the target.

11. A method of controlling the field of view of a camera used in a system for the automatic tracking of a target with the field of view comprising the steps of:
- A. automatically tracking the target;
- B. determining at least one specific field of view of the camera;
- C. remembering by the system at least one selected specific field of view of the camera; and
- D. controlling by the system the cessation of automatic tracking in step A of the target to return to at least one selected specific field of view of the camera remembered in step C.

12. The method of claim 11 wherein step B includes the step of:
- E. determining the at least one specific field of view of the camera of step B by automatically tracking the target to the one specific field of view of the camera which is remembered in step C.

13. The method of claim 11 further including the step of:
- E. re-enabling the automatic tracking disabled in step D to begin tracking of the target by the camera.

14. The method of claim 11 further including the steps of:
- E. remembering by the system another specific field of view of the camera; and
- F. controlling the field of view of the camera to go from one remembered specific field of view to another remembered specific field of view.

15. The method of claim 11 further including the step of:
- E. issuing commands from the target to remember the at least one specific field of view of a step C and to control the cessation of automatic tracking and to return to the at least one remembered specific field of view of step D.

16. A method of controlling the field of view of a camera used in a system for the automatic tracking of a target with the field of view comprising the steps of:
- A. automatically tracking the target;
- B. issuing a command to the system for controlling the cessation of automatic tracking of the target; and
- C. issuing a direction of movement command to the system to move the field of view in accord with the movement command.

17. The method of claim 16 wherein step C further includes the step of:
- D. issuing speed control information in the direction of movement command to move the field of view at a specific rate.

18. The method of claim 17 wherein step D further includes the step of:
- E. varying the speed control command to selectively increase or decrease the movement of the field of view.

19. The method of claim 16 further including the step of:
- D. issuing another command to begin tracking of the target.

20. A method of controlling the field of view of a camera used in a system for the automatic tracking of a target with the field of view comprising the steps of:
- A. automatically tracking the target;
- B. determining when automatic tracking of the target in step A is no longer possible; and
- C. continuing to move the field of view of the camera in substantially the same direction and at the same rate as the field of view was moving during automatic tracking of the target when tracking is no longer possible.

21. The method of claim 20 further including the step of:
- D. automatically returning to automatic tracking of the target when automatic tracking becomes possible.

22. A method of controlling the field of view of a camera used in a system for the automatic tracking of a target with the field of view comprising the steps of:
- A. automatically tracking the target;
- B. controlling the zoom perspective of the camera's field of view by the system; and
- C. issuing commands to the system for controlling the zoom perspective of the camera's field of view.

23. The method of claim 22 further including the step of:

D. issuing the commands of step C by the target to control the zoom perspective of the camera's field of view.

24. The method of claim 22 further including the steps of:

D. remembering by the system a plurality of zoom perspectives;

E. issuing command to the system to recall a zoom perspective remembered in step D; and F. controlling by the system the camera field of view to provide the zoom perspective of step E.

25. A method of controlling the field of view of a camera used in a system for the automatic tracking of a target with the field of view comprising the steps:

A. automatically tracking the target with the field of view;

B. continuously determining by the system when automatic tracking of the target in step A is no longer possible;

C. continuing to move the field of view of the camera by the system in substantially the same direction and at the same rate as the field of view was moving during automatic tracking of the target when tracking is determined no longer possible; and D. automatically returning the system to operation in the automatic tracking of the target when tracking is determined to be operative by the system.

26. A method of positioning and operating a camera mounted on a tracking unit comprising the steps of:

A. automatically tracking a target with the field of view of the camera;

B. defining tracking error as the difference between the desired and actual positions of the target with respect to the camera field of view;

C. automatically determining by the tracking unit the error defined in step B; and D. establishing by the tracking unit a plurality of selectable tracking response modes, each mode resulting in a different tracking response of the tracking unit for the same determined error.

27. The method of claim 26 further including the steps of:

E. automatically determining the time period that an error exists;

F. establishing by the tracking unit a time period that a predetermined amount of error must exist before the camera field of view is changed by the tracking unit; and G. changing the camera field of view when a predetermined amount of error exists for the predetermined time period established in step F.

28. A method of controlling the field of view of a camera in a system for the automatic tracking of a target with the field of view comprising:

A. providing by the system a user-selectable reference position representing the desired position of the target in the field of view;

B. selectively changing by the user the reference position to provide a desired location of the target in the field of view; and C. automatically tracking the target with the field of view of a camera in accord with the reference position selected in step B.

* * * * *